3,325,420
TRITIUM-ACTIVATED LUMINOUS PIGMENTS
Rudolf Futterknecht, Stuttgart-Wangen, and Wilhelm Neumann, Stuttgart-Feuerbach, Germany; said Neumann assignor to Westo Gesellschaft mit beschrankter Haftung Fabrik für Chemisch-Technische Erzeugnisse, Feuerbach, Germany
No Drawing. Filed Apr. 15, 1964, Ser. No. 360,145
19 Claims. (Cl. 252—301.1)

The present invention relates to luminous pigments and, more particularly, the present invention is concerned with tritium-activated luminous pigments which comprise a pulverulent luminescent material, each particle of which is coated with a firmly adhering, thin, glass-clear skin consisting of a synthetic resin in which tritium is chemically bound.

The present invention is furthermore concerned with a method for producing the tritium-containing synthetic resin.

It is an object of the present invention to produce in a simple and economical manner a mass of pulverulent free-flowing or freely pouring luminous pigments.

Other objects and advantages of the present invention will become apparent from a further reading of the description and of the appended claims.

With the above and other objects in view, the present invention contemplates a method of producing tritium-activated luminous pigments, comprising the steps of incorporating tritium in an organic compound including at least one member of the group consisting of (—CH$_2$—CH$_2$OH)— and/or (—CH$_2$—CHOH—CH$_2$)—, and contacting a pulverulent luminescent material with the thus-formed tritium-containing organic compound and with an isocyanate as a cross-linking agent therefor in a quantity sufficient to form on the individual particles of the pulverulent luminescent material a coating of a hard, tritium-containing synthetic resin which is insoluble and will not swell in water and organic solvents and which, due to its tritium content, is capable of inciting the luminescence of the thus-coated particles of the pulverulent luminescent material.

The present invention is also concerned with a luminous pigment consisting essentially of a pulverulent mass of luminescent particles being individually coated with a tritiated hard, substantially water and organic solvents-insoluble synthetic resin consisting of an intimate mixture of at least one tritiated organic compound cross-linked with an isocyanate and of an auto-polymerized isocyanate.

The invention also includes a method for producing a hard tritiated resin which will not swell in water and organic solvents and which is capable of inciting the luminescence of luminescent material, which tritiated synthetic resin may serve for forming the coating on the individual particles of the luminescent material.

The starting material for forming the tritiated resin according to the present invention will be an unsaturated organic compound which contains at least one, preferably, however, two or more, (—CH$_2$—CH$_2$OH)— groups and/or at least one, preferably two or more, (—CH$_2$—CHOH—CH$_2$)— groups. It is also possible to incorporate the tritium in a simpler organic compound and then to synthesize the organic compound containing one or the other of the two above mentioned groups from such simpler tritium-containing organic compound.

The luminescent material which is coated with the tritiated resin may be any conventional luminescent material such as copper-activated zinc sulfide, calcium sulfide, zinc sulfide, cadmium sulfide, strontium sulfide, magnesium sulfide or mixtures of these sulfides, as well as calcium-aluminum fluoride, barium silicates, phosphates, borates, tungstenates, and the like. These luminescent materials may be activated by adding thereto traces of less than 1% of a heavy metal such as bismuth, copper, thallium, silver, manganese, as well known in the art. Other luminescent pigments are, for instance, cadmium borate which will give a red glow, calcium silicate containing manganese which will give a yellow-orange glow or zinc-beryllium silicate with manganese which will give a green glow.

According to the present invention, the thin coating or skin which will cover and firmly adhere to the small core of luminescent material consists of a synthetic resin-like substance which is obtained by tritiating at least one of the above mentioned aromatic or unsaturated aliphatic compounds, in other words, by the chemical addition of tritium to such compounds.

It is also possible to incorporate tritium into a simple organic compound during synthesizing of such simple organic compound and then, utilizing known methods, to synthesize from the already tritium-containing organic compound a compound which includes one or the other of the two above mentioned groups which are capable of being cross-linked with isocyanates.

Particularly suitable for incorporating tritium therein and for thereafter cross-linking the compound with an isocyanate are derivatives of aromatic hydrocarbons such as para-phenylenediethyl glycol, 4,4'-diphenylmethanediethyl glycol, 4,4',4''-triphenylmethanetriethyl glycol or compounds of similar structure. These derivatives of aromatic hydrocarbons are capable by tritiation of the benzene nucleus to firmly bind the largest proportion of tritium for a given weight of the compound. This is particularly important when the luminescent material is to be activated to give a very high degree of luminosity. The compounds in which tritium has been incorporated in the benzene ring, are particularly stable against destruction by the radiation emanating from the tritium.

Side reactions may occur during tritiation so that, instead of adding tritium to the compound by substitution, tritium is exchanged against hydrogen. Usually, in such cases, the hydrogen is exchanged against tritium at portions of the molecule which cannot be controlled or determined. The bond of the tritium which is introduced into the organic compound by exchanging it against hydrogen is generally labile or semi-labile. Such tritium which is bound in a labile or semi-labile manner is easily washed out by dissociation in an aqueous medium. For this reason, the present invention provides, in order to suppress such exchange reactions, to carry out tritiation as quickly as possible, and to tritiate the organic compound while the latter is in molten condition and free of water or solvent.

This is important because by using hydrogen-containing solvents there always exists the possibility of exchange of hydrogen in the solvent against tritium. Consequently, hydrogen-containing solvents should not be used during tritiation according to the present invention.

Since dissolution of the organic compound which is to be tritiated will dilute the concentration of the organic compound and thereby retard tritiation, the present invention generally provides that the organic compound is to be free of solvents while being tritiated and therefore should be in molten condition.

Since tritiation preferably is carried out in the presence of a hydrogenation or tritiation catalyst, it is desired according to the present invention that the melting point of the substance which is to be tritiated should be in the vicinity of the temperature of optimum effectiveness of the catalyst.

Suitable catalysts for tritiation according to the present invention are primarily those which possess a high degree of activity and a large surface area. Thus, for instance, palladium or palladium carbon are very suitable since these catalysts are effective over a relatively broad range of temperatures, namely, from about 20° C., to temperatures as high as 50° C. Preferably, however, platinum and particularly platinum in the form of platinum black is used as the catalyst, since it can be used and reused practically without loss. Platinum or platinum black are best suitable for hydrogenation of the benzene ring and show high activity at temperatures between 70 and 90° C. However, Raney-nickel is also well suitable. The optimum temperature range for Raney-nickel catalysts is between 100 and 110° C., and Raney-nickel is particularly effective for hydrogenation or tritation of unsaturated aliphatic compounds. The hydrogenation temperature for the compounds mentioned above is therefore preferably chosen between 80 and 120° C. and either platinum black or Raney-nickel is used as a catalyst, as will be described in more detail in the examples.

Conventionally, the catalyst is used in an amount of between 1% and 10% of the weight of the compound which is to be tritiated. However, while it is possible according to the present invention to operate with catalyst proportions as low as 1%, preferably the catalyst is employed in quantities equal to between 50% and 200%, or even more, of the weight of the compound which is to be tritiated. Thus, in order to speed up tritiation, the present invention prefers to use relatively very large amounts of catalyst, which, for instance, may be 20 times the conventional amounts or proportions of catalyst, or even more.

In addition, in order to further speed up the tritiation of the organic compound, it is preferred according to the present invention to work at superatmospheric pressure. The degree of superatmospheric pressure which may be applied will depend on the operating conditions, particularly on the pressure to which the tritiation apparatus which is usually formed of glass may be exposed. Absolute pressures of between 1.7 and 2 atmospheres give good results, i.e. cause a very considerable increase in the speed of the tritiation.

The tritiation of the organic compound may be carried out, for instance, in a pear-shaped reaction vessel made of Pyrex glass. The reaction vessel contains the organic compound which is to be tritiated and the catalyst. Furthermore, it is preferred to introduce into the reaction vessel glass spheres having a diameter of between about 2 and 2.5 mm. During tritiation, the reaction vessel is subjected to vibration and it is achieved thereby, particularly due to the glass spheres in the mass during tritiation of the same, that the molten organic compound and the gaseous tritium are continuously mixed and remixed. The enlargement of the reaction surface due to the rotating and oscillating glass spheres and the continuous mixing of the reactants will cause an additional increase in the speed of the tritiation.

The present invention also provides that the reaction vessel, after introduction of the organic compound which is to be tritiated and of the catalyst, as well as of the glass spheres, will be thoroughly evacuated under simultaneous heating, in order to remove moisture and other volatile foreign substances prior to introduction of the tritium gas.

After completion of the tritiation, the reaction vessel is shattered and the solidified tritiated organic compound therein is then dissolved in a suitable solvent, such as chloroform, and separated from catalyst, glass splinters and glass spheres by filtration under pressure.

The thus tritiated organic compound which contains reactive groups adapted to be cross-linked with isocyanates is then subjected to such cross-linking. The choice of a suitable cross-linking agent and the manner in which the cross-linking is carried out are of great importance for the quality of the finally produced luminous pigment.

The tritiated compound must be such that after cross-linking it will remain glass clear and that it will not become yellowish upon being exposed to light and tritium radiation. The cros-linked tritiated compound must firmly adhere to the particles of luminescent material and must be insoluble in conventional solvents and water. Furthermore, the degree of cross-linking must be so high that the skin-forming, cross-linked tritiated compound will not swell in contact with conventional solvents and water.

The above discussed qualities are best achieved according to the present invention by carrying out cross-linking with isocyanates such as diisocyanates, triisocyanates, polyisocyanates and the like. Very good results are achieved by cross-linking the tritiated organic compound with hexamethylene diisocyanate, and particularly suitable is a polyisocyanate which is produced from hexamethylene diisocyanate by Farbenfabriken Bayer, Leverkusen, and commercially available under the trade name Desmodur N. The polyisocyanate Desmodur N as cross-linking agent will result in glass clear films of the cross-linked synthetic resin and high resistance against yellowing.

In order to achieve firm adherence of the cross-linked tritiated synthetic resin to the surface of the individual particles of luminescent material, as well as a high degree of hardness and resistance against swelling, it is important, according to the present invention that the cross-linking agent is capable of auto-polymerization, i.e., homopolymerization and is introduced in excess, preferably in a very large excess over the amount thereof which is required for completion of cross-linking of the tritiated organic compound.

The excess amount of the isocyanate cross-linking agent may be between 1% and 500%, or even much more, of the weight of the tritiated organic compound which is to be subjected to cross-linking. However, preferably, and depending on the type of the organic compound which is to be cross-linked, the organic compound which is to be cross-linked, the isocyanate cross-linking agent will be applied in an amount which exceeds the quantity thereof required for cross-linking by between 50% and 500% of the weight of the tritiated organic compound.

The cross-linking of the OH-groups of the tritiated organic compound with an isocyanate is carried out according to the present invention in the complete absence of water and air, preferably under a high degree of vacuum and at elevated temperature.

After cross-linking is completed, atmospheric pressure is restored and the reaction mixture is exposed to an atmosphere of between 95% and 100% relative humidity. Under those conditions and at an elevated temperature, the auto-polymerization of the cross-linking agent is then completed.

It has been found that by utilizing an excess of cross-linking agent in accordance with the present invention, a particularly firm anchoring of the tritium-containing cross-linked synthetic resin to the particle of luminescent material is achieved, as well as an increase in the hardness of the coating or film and, furthermore, that the thus-formed film is highly resistant to swelling in solvents or water.

The following examples are given as illustrative only of the present invention, without limiting the invention to the specific details of the examples.

*Example 1*

50 mg. of para-phenylenediethyl glycol and about 75 mg. platinum black are weighed into a pear-shaped hydrogenation vessel having a capacity of about 2.5 cm.³. The major portion of the residual space in the hydrogenation vessel is filled with glass spheres having a diameter of between about 2 and 2.5 mm. The hydrogenation vessel is attached to and communicates with the tritiation apparatus by means of a spring-like glass coiled tube. After introduction of the organic compound which is to be tritiated, the catalyst and the glass spheres, the feed tube through which the hydrogenation vessel has been filled is molten down so as to close the vessel which now communicates only with the tritiation apparatus. The entire apparatus is now evacuated while simultaneously the tritiation or hydrogenation vessel is heated to about 60° C. and then again cooled. 20 cm.³ of 99% tritium are then introduced into the tritiation apparatus and pressed at an absolute pressure of between 1.7 and 2.0 atmospheres into the hydrogenation or tritiation vessel. An electromagnetic oscillating device is used in order to cause an oscillating movement of the tritiation vessel and the material contained therein, while the tritiation vessel is simultaneously heated to about 85° C. The tritiation is completed when the 20 cm.³ of tritium have been taken up by the para-phenylenediethyl glycol. Thereafter, the tritiation vessel is separated from the remainder of the apparatus, and shattered. The tritiated substance is separated from the glass splinters, glass spheres and catalyst by dissolution in water-free chloroform and subsequent pressure filtration. The chloroform-dissolved tritiated substance is then filled into a measuring beaker.

This solution contains 50 mg. of tritiated para-phenylenediethyl glycol;

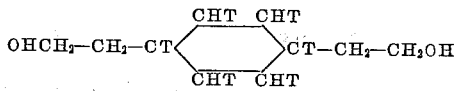

and, corresponding to the milli-mol weight relationship, 50 curie.

This is calculated as follows:

10 C = 120
14 H =  14
 2 O =  32
     ─────
       166   6T = 18 mg.   T = 3 × 22.4 = 67.2 ml. T

In order to take up 50 curie, equal to 20 cm.³ T, there will be required:

$$\frac{18 \text{ mg.} \cdot 20 \text{ cm.}^3}{67.2 \text{ cm.}^3} = 5.36 \text{ mg.} \quad \frac{166 \text{ mg.} \cdot 5.36}{18} = 50 \text{ mg.}$$

According to the present example, this amount of tritiated compound is used for activating 250 grams of luminescent pigment in order to obtain a specific activity of $$\frac{50 \text{ curie}}{250 \text{ grams}} = 0.2 \text{ curie/gram}$$

In order to evenly wet 250 grams of the luminescent pigment so as to form a firmly adhering hard coating on the individual particles thereof and to activate the pigment, the solution of the tritiated compound plus cross-linking agent is adjusted to 25 cm.³.

For this purpose, the above formed solution of the tritiated compound is placed in a graduated measuring beaker or cylinder and it is determined how much of a solution of the cross-linking agent is to be added, to form 25 cm.³ of a combined solution. The cross-linking agent is then dissolved in such an amount of a suitable solvent for the same that the total volume of the combined solutions will be 25 cm.³.

For cross-linking 50 mg. of the compound containing two OH groups per molecule, and in order to obtain the desired excess of cross-linking agent, 10.25 mg. of the polyisocyanate Desmodur N are required. The OH content of the para-phenylenediethyl glycol equals 166:34 or 20.5%. Thus, 50 mg. of this compound contain 10.25 mg. of OH groups.

OH:OCN = 17:42 = 1:2.47; OCN = 10.25 × 2.47 = 25.3 mg.

The OCN content of a 75% Desmodur N solution equals 16%.

Thus, there will be required:

Desmodur solution: $\frac{25.3 \times 100 \times 100}{16.0 \times 75} =$ 211 mg. + 50% excess = 316 mg.

The total weight of the thus cross-linked tritium-containing substance equals:

50 mg. starting material plus 5.36 mg. T plus $$\frac{316 \times 75}{100} = 237 \text{ mg.}$$

cross-linking agent, or a total of 292.36 mg.

Thus, 292.36 mg. of cross-linked, tritium-containing compound are used to activate 250 grams of luminescent pigment, or 1.17 mg. of cross-linked tritium-containing resin per gram of luminescent pigment. The activated resin will form a thin, hard, firmly adhering coating on the individual pigment particles.

The luminescent pigment is then coated immediately after combining the two solutions, by mixing the pigment intimately with the combined solution which has been heated to about 70° C. This mixing, preferably is carried out in a shallow dish. All of the manipulative steps involving the tritiated compound, such as dissolving the same from the broken tritiating vessel, filtration, mixing, and application to the pigment must be carried out in a depression chamber (Glove box) in order to comply with the regulations applicable at least in Germany for protection against radiation. The solvent (chloroform) will quickly evaporate under constant stirring in the shallow dish. Shortly prior to completion of the evaporation of the solvent, the mass is introduced into a round flask and under constant movement or shaking of the flask, the same is evacuated. The cross-linking of the OH-groups with the polyisocyanate takes place relatively slowly since autopolymerization is interrupted by the lack of humidity. By constant movement of the pigments during coating of the same in the flask, at a temperature of 70° C., the cross-linking will be completed in about 8 hrs.

In order to bind the excess polyisocyanate by homopolymerization, the contents of the round flask are now exposed to an atmosphere of about 100% relative humidity and the flask is constantly shaken or subjected to an oscillating movement for another 48 hours or more, until autopolymerization is completed and the individual pigment particles will now be covered with a firmly adhering hard skin of the tritium-containing resin.

The thus formed mass of luminous particles is dried and then screened through a screen formed of synthetic resin. The thus produced mass of actively luminous particles is preferably stored in an evacuated container.

The luminous intensity of the luminous pigment produced as described above and having a specific tritium activity of 0.2 C/g. is of the magnitude of 40 microlambert, when the pigment which is thus coated consists of copper activated zinc sulfide having a maximum particle size of 10 microns with at most half of the number of particles being of a size lesser than 10 microns.

*Example 2*

38.2 mg. of 4,4'-diphenylmethanediethyl glycol

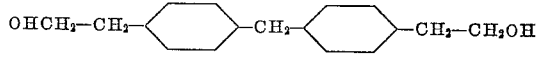

are weighed into a tritiating vessel having a capacity of about 2.5 cm.³, together with about 60 mg. platinum black, and the tritiation is carried out with 20 cm.³ T, equal to 50 curie in the same manner as described in Example 1. Corresponding to the lesser percentage amount of OH-groups, namely 13.3% of 38.2 mg. in the present example, instead of 20.5% of 50 mg. in Example 1, in order to obtain the same excess of cross-linking agent, only about 50% of the amount of cross-linking agent required according to Example 1 will be needed, provided that the same cross-linking agent is used. Therefore, the total weight of the completed tritium-containing resin having an activity of 50 curie will be only 38.2+5.36+116, equal to 160.00 mg. Consequently, the weight per unit of surface area upon activating the same amount of luminescent pigment as in Example 1 will be considerably less.

*Example 3*

37 mg. of 4,4′,4″ - triphenylmethanetriethyl glycol

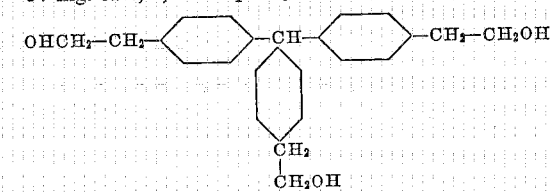

are tritiated together with 60 mg. platinum black in the same apparatus and in the same manner as described in Examples 1 and 2. For cross-linking with the same excess of the same cross-linking agent and by using the same amount of the same luminescent pigment, substantially the same amount of cross-linking agent will be required as in Example 2.

*Example 4*

If a polyester with terminal OH-groups and a group number of between 3 and 5 is formed of the paraphenylenediethyl glycol of Example 1 and of a para-phenylenediacetic acid:

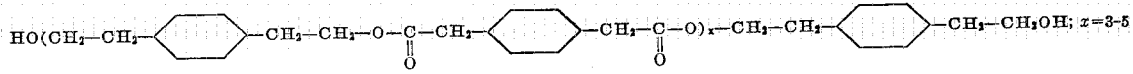

and the thus formed polyester is tritiated in the same manner in the same apparatus as described in the preceding examples, then the thus formed tritiated material can be utilized in the same manner as described in Example 1 with a slightly changed tritiation temperature, e.g. 80° C. Due to the reduction in the number of terminal OH-groups, the amount of cross-linking agent can be even further reduced than in Examples 2 and 3. However, in order to form on the pigment particles a coating of the desired hardness of the cross-linked substance, according to the present example, the excess of polyisocyanate is increased from 100% to between 200% and 300%. Nevertheless, the weight per unit of surface area of the cross-linked tritiated compound will be less than in Example 3.

*Example 5*

By using a polyether of 4-phenylenediethyl glycol with terminal OH-groups:

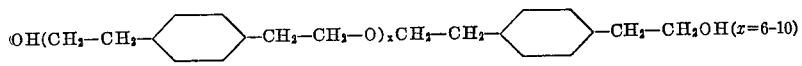

and carrying out tritiation, recovery of the tritiated organic compound, cross-linking and forming of the coating on the luminescent particles as in the preceding examples, it will be found that, by using substantially the same amount of the reactants, about 50 curie, or 20 cm.³ T will be taken up and in view of the even further reduced proportion of OH-groups an even smaller amount of polyisocyanate is required for cross-linking. According to the present example, in order to sufficiently harden the cross-linked material, a further increase in the excess of polyisocyanate to between 400% and 500% of the weight of the initially tritiated compound is required. Nevertheless, the weight of the tritiated resin per unit of surface area will be less than in Examples 3 and 4.

"Weight per unit of surface area" is the weight of the cross-linked tritiated agent in mg./cm.² of the individual particles of the pulverulent luminescent material.

*Example 6*

240 mg. of the fatty alcohol of ricinoleic acid:

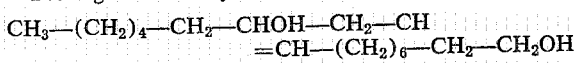

together with 100 mg. of Raney-nickel 50:50 catalyst under alcohol are weighed into the tritiating vessel as described in Example 1 and, after evaporation of the alcohol, tritiated as described in Example 1. Tritiation is carried out, however, at a temperature between about 105 and 110° C. As solvent for the tritiated compound, acetic acid ester is used which had been subjected to repeated distillation, and the hexamethylenediisocyanate

commercially available as Desmodur H is used as the cross-linking agent.

The cross-linking agent is added in an excess of about 200%. The OH-groups represent 6.35% of the fatty alcohol or 15.2 mg. and consequently 15.4×2.47×3.0, equal to 114 mg. OCN equal to 228 mg. hexamethylenediisocyanate are introduced. The combined solutions are applied to the luminescent pigment as described in Example 1.

*Example 7*

The ricinoleic acid triglyceride:

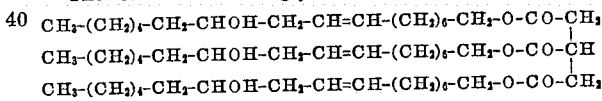

is used as the substance which is to be tritiated.

267 mg. of the glyceride are tritiated together with 110 mg. Raney-nickel 50:50 catalyst as described in Example 6, dissolved and filtered. The OH-groups represent 5.48% or 14.6 mg. and there is required therefore: OH:OCN equal to 1:2.48+300%, equal to 145 mg. OCN, equal to 290 mg. hexamethylenediisocyanate, in order to produce the hard tritiated cross-linked resin with an excess of the isocyanate of 300%.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing tritium-activated luminous pigments comprising the steps of incorporating tritium in an organic compound adapted to be cross linked with an isocyanate and including at least one member of the group consisting of (—CH$_2$—CH$_2$OH)— and (CH$_2$—CHOH—CH$_2$)— and contacting a pulverulent luminescent material with the thus-formed tritium-containing organic compound and with said isocyanate as a cross-linking agent therefor in a quantity sufficient to form on the individual particles of said pulverulent luminescent material a coating of a hard, tritium-containing synthetic resin which is insoluble and will not swell in water and organic solvents and which, due to its tritium content, is capable of inciting the luminescence of the thus-coated particles of said pulverulent luminescent material.

2. A method as defined in claim 1, wherein said organic compound is selected from the group consisting of para-phenylenediethyl-glycol, 4,4'-diphenylmethanediethyl-glycol, 4,4',4''-triphenylmethanetriethyl-glycol.

3. A method as defined in claim 2, wherein said tritium is incorporated in said organic compound in such a manner as to convert the benzene ring of the respective glycol by addition of tritium thereto into a cyclo-aliphatic six member ring.

4. A method as defined in claim 1, wherein said organic compound includes at least two (—CH$_2$—CH$_2$OH)— groups.

5. A method as defined in claim 1, wherein said isocyanate is selected from the group consisting of diisocyanates, triisocyanates and polyisocyanates.

6. A method as defined in claim 5, wherein said isocyanate is hexamethylene diisocyanate.

7. A method as defined in claim 1, wherein said organic compound is selected from the group consisting of para-phenylenediethyl-glycol, 4,4'-diphenylmethanediethyl-glycol and 4,4',4''-triphenylmethanetriethyl-glycol, and said isocyantae is hexamethylene diisocyanate.

8. A method as defined in claim 1, wherein said organic compound is para-phenylenediethyl-glycol.

9. A method as defined in claim 1, wherein said organic compound is 4,4'-diphenylmethanediethyl-glycol.

10. A method as defined in claim 1, wherein said organic compound is 4,4',4''-triphenylmethanetriethyl-glycol.

11. A method as defined in claim 1, wherein said tritium is incorporated in said organic compound in the presence of a hydrogenation catalyst selected from the group consisting of palladium, platinum, and Raney nickel, said organic compound having a melting point within the range of the effective temperature of said catalyst, and said organic compound is in molten state during the incorporation of said tritium therein.

12. A method as defined in claim 11, wherein sa: catalyst is present in an amount of between about 50% and 200% of the weight of said organic compound.

13. A method as defined in claim 1, wherein said i: corporating of said tritium in said organic compound carried out in the presence of a plurality of relativel small inert substantially spherical bodies and while sul jecting the reaction mixture to an oscillatory movemer so as to displace said spherical bodies, thereby causin intimate contact between said tritium and said organ: compound.

14. A method as defined in claim 1, wherein said isc cyanate is present in an amount in excess of the amour thereof required for cross-linking with said tritium-cor taining organic compound, so as to cause in addition t cross-linking of said tritium-containing organic compoun with said isocyanate also homopolymerization of said e: cess amount of said isocyanate.

15. A method as defined in claim 14, wherein said e: cess amount of said isocyanate is equal to between abot 50% and 500% of the weight of said tritium-containin organic compound.

16. A luminous pigment consisting essentially of a pu verulent mass of luminescent particles being individuall coated with a tritiated hard, substantially water and o1 ganic solvents-insoluble synthetic resin consisting of a intimate mixture of at least one tritiated organic con pound cross-linked with an isocyanate and of a homc polymerized isocyanate.

17. A luminous pigment as defined in claim 16, where in said isocyanate is hexamethylene diisocyanate.

18. A luminous pigment as defined in claim 16, where in said tritiated organic compound is selected from th group consisting of tritiated para-phenylenediethyl glycol, 4,4'-diphenylmethanediethyl-glycol and 4,4',4'' triphenylmethanetriethyl-glycol.

19. A luminous pigment as defined in claim 18, where in said isocyanate is hexamethylene diisocyanate.

References Cited
UNITED STATES PATENTS

| | | | |
|---|---|---|---|
| 3,033,797 | 5/1962 | De Leo et al. | 252—301. |
| 3,224,978 | 12/1965 | MacHutchin et al. | 252—301. |
| 3,238,139 | 3/1966 | Fischer et al. | 252—301. |

CARL D. QUARFORTH, *Primary Examiner.*

BENJAMIN R. PADGETT, *Examiner.*

L. A. SEBASTIAN, *Assistant Examiner.*